Nov. 28, 1967 P. PATRIARCHE ETAL 3,355,274
METHOD OF AND MEANS FOR MANUFACTURING ELECTRON TUBE SOCKETS
Filed Nov. 5, 1964 3 Sheets-Sheet 1

United States Patent Office 3,355,274
Patented Nov. 28, 1967

3,355,274
METHOD OF AND MEANS FOR MANUFACTURING ELECTRON TUBE SOCKETS
Pierre Patriarche, Courbevoie, and Roger Letournier, Colombes, France, assignors to Compagnie Industrielle Francaise des Tubes Electroniques, Timbaud, France
Filed Nov. 5, 1964, Ser. No. 409,252
Claims priority, application France, Nov. 8, 1963, 953,128, Patent 1,383,051; 953,129, Patent 1,383,052
6 Claims. (Cl. 65—23)

ABSTRACT OF THE DISCLOSURE

A method and mold for manufacturing an electron tube base by temporarily disposing in the mold a plurality of pre-shaped leads of the electron tube in an arrangement corresponding to the arrangement thereof in a finished tube. The base is formed or molded about the leads by inserting the leads into lead-insertion holes on a disc-shaped destructible die metallic film die received in the mold cavity and while supported therein introducing into the mold over the film die glass particles which are melted into an integral mass defining the tube base. Pressure forces are applied to the molten glass by a press member in the mold operable axially relative to the leads causing it to assume a desired configuration and to flow about a given length of each lead and adhere thereto. The press member is removed after the molten glass has hardened or set sufficiently. The formed tube base along with the leads and film die are removed from the mold and the destructible die is removed mechanically or chemically.

---

This invention relates to a method of manufacturing electron tube bases, whereby these bases made of molded glass can be obtained directly, by pressing, complete with pre-bent current leads, the term base (or "wafer") designating in the terminology of electron tubes the glass component provided with metal leads adapted to support the tube electrodes and/or to constitute connections for these electrodes.

It is known that these bases, when they attain certain dimensions, cannot be manufactured in automatic pressing machines and must therefore be produced either by pressing a molten glass parison deposited into a mold in which suitably prepared leads are inserted beforehand, or by re-melting in this mold crushed glass fragments substituted for the aforesaid parison. In the first case the mold is made of metal and the operation is carried out in a press in the free atmosphere. In the other case, the mold is made up of graphite and the pressing operation is carried out in a furnace, in a neutral atmosphere, and the pressure necessary for properly distributing the glass in all the mold cavities is produced by simply applying an additional weight on the mold punch or equivalent member.

In the commercial manufacture of electron tubes this last solution is generally preferred because it is more convenient to exploit in the shops of this industry. In fact, by using a previously prepared glass the inconveniences characterizing the operation of glass fusing furnaces can be avoided; as a result, this method of manufacturing electron tube bases is now almost the only one used in the manufacture of emitter tubes having bases of relatively great dimensions, even in the case of low-power tubes (due, more particularly, to the high electric insulation requirements between electrodes).

Due to the necessity of disposing the metal leads of these bases generally on a circle (for obvious reasons concerning both the internal tube connections and the insertion of the finished tube on its support) in the case of multi-electrode tubes, such as pentodes, these leads must be bent and/or cranked along their portions to be placed within the tube, to permit their connection with the electrodes proper. Now, since emitter tubes are made, in most cases, from so-called "hard" glass types, the current leads therefor are made from a metal consistent with these glass qualities, such as molybdenum or iron-nickel-cobalt alloys. Besides, since the current intensities to which these leads are subjected in actual operation are relatively high, and since on the other hand the finished product must be capable of meeting strict requirements as to their shock and vibration resistance, these leads must have an adequate stiffness and, therefore, a wire diameter capable of providing this stiffness, which, in conjunction with the inherent rigidity of the metals or alloys used in their manufacture, make the bending and cranking steps of said lead-in conductors particularly difficult and delicate. In fact, these bending and cranking steps should be carried out, in most instances, as close as possible to the inner surface of the glass socket in order to minimize the tube dimensions. Under these conditions, it is obvious that such bending and cranking operations are detrimental to the quality of the closely adjacent glass-to-metal seals; although these handling and manufacturing steps are carried out by experienced and skilled hands, such bending and cranking operations are always liable to create undesired cracks resulting, in the finished tube, in microleaks frequently observed in post-production tests.

It is the essential object of the present invention to void this serious inconvenience by producing directly by molding, from crushed glass particles or fragments, the aforesaid tube bases equipped with lead-in conductors to which the final shape is imparted beforehand, i.e., by pre-bending them to the contour which they must necessarily have for supporting the tube electrodes or permitting their connection with these electrodes, without resorting to any subsequent manual operations after the socket has been extracted from the mold.

The technique of molding, from crushed glass, electron tube bases having rectilinear leads (that is lead-in and lead-out conductors) is well known per se. The graphite molds used to this end are made up of a "pocket" or die and of a "punch," this punch or plunger is guided by a "ring" consisting in general of two elements and fitting on the pocket. The punch and pocket are provided with exactly registering holes for properly positioning the lead-in and lead-out conductors. The manufacturing process is as follows: after having disposed the leads in the holes of the pocket provided with the ring, the glass, in the form of small fragments corresponding to a predetermined granule size, is poured in proper quantity and distributed over the bottom surface of the pocket. Then the punch or plunger is properly positioned in the ring, so that the leads or like conductors are introduced into the corresponding holes. The mold is subsequently placed in a glass fusion furnace (in which a neutral atmosphere is maintained in order to avoid any graphite combustion) and an additional weight is applied to the punch so that the molten glass will spread throughout the space available therefor, thus taking around the leads the exact shape of said pocket and punch. After cooling, the assembly is stripped from the mold.

Apart from the necessity of using shapes having an adequate taper, this stripping step is possible only if rectilinear leads are used, or if both pocket and punch are adapted to be broken down to pieces easy to separate from one another about these leads. Now, as already stated, these molds are made of graphite. Although these graphite molds can also consist of detachable elements (however at a considerable cost due to the extremely accurate milling and fitting operations involved), it is obvious that this method of manufacturing such molds, even for a relatively small number of parts, should be totally precluded owing to the necessity of disassembling and re-assembling, upon each molding operation, these mold elements necessarily made of a brittle material easily coming off in flakes.

It is the scope of this invention to avoid these machining and maintenance complications by replacing the solid graphite pocket with a thin, pressed, disc-shaped metal part or die having the desired configuration for the internal surface of the socket and formed with the holes corresponding to the relative positions and diameters of the lead-ins, this pressed metal part is supported by an annular shoulder formed either on the graphite ring or on the mold base. Thus, the previously bent leads can easily extend beneath the pressed part into the mould, irrespective of their contour. Their orientation is determined by holes properly positioned in a guide member or base on which said ring is caused to bear, the holes receive the lower ends of the leads.

Under these conditions, the melting step is exactly the same as in the above-described case. The socket thus obtained is stripped jointly with the metal pressed part on which it was molded and which still adheres to it. However, this metal, such as nickel annealed in vacuo, is so selected that the glass cannot adhere thereto. Moreover, the surface of the pressed part or die which is to contact the glass may be coated beforehand with a release agent such as carbon black, for example the one developed by a fuliginous acetylene flame. As the metal thickness is selected to be as thin as possible, considering the necessary depth of the pressed thimbles for molding the insulating studs (the metal thickness ranging preferably from about .002" to about .004") the metal can easily be torn off or cut (for example by using a pair of small sharp-edged scissors) down to the leads whereafter the remaining fragments of the pressed metal parts can be removed, thus freeing the base completely. Thus, the tube base is provided, by molding, with bent and cranked leads having exactly the required dimensions.

At least some of the current leads are advantageously formed integrally with the corresponding electrode supports carrying the corresponding electrodes.

In order to afford a clearer understanding of this invention and of the manner in which the same may be carried out in practice, reference will now be made to the accompanying diagrammatic drawings, in which.

Figure 2:
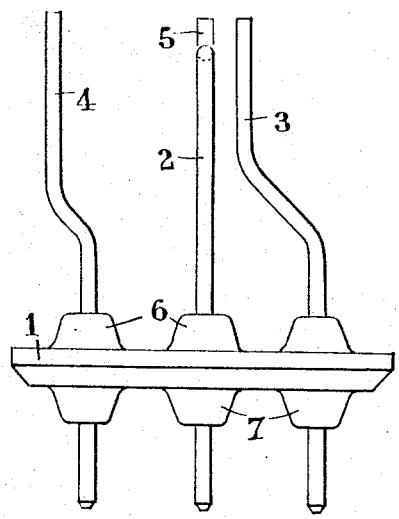
FIGURES 1 and 2 are respectively a plan view from above and a side elevational view of an electron tube base molded integrally with the bent and cranked leads disposed in the respective positions illustrated.
Figure 1:
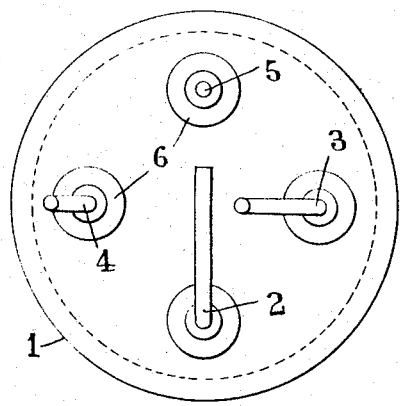

Referring first to FIGURES 1 and 2, the reference numeral 1 designates a molded glass element, provided with four leads 2, 3, 4, 5 (made of metal adapted to adhere by welding to said glass). In the specific case illustrated involving a four-lead base; however, it is clear that the number of leads is optional and should not be construed as limiting this invention, this number having been chosen only with a view to simplify the drawing while providing a complete exemplary illustration of a base made according to the teachings of this invention, notably in connection with the shape given to the leads. Thus, the lead 2 has a simple 90-degree bend, leads 3, 4 are each cranked, but directed the one towards and the other away from the base centre, and the lead 5 is rectilinear, as in a specific case selected among many other disposals comprising bent and cranked leads. The bent leads such as 3, 4 and 5 may also, if desired, each have any desired orientation about the straight portion thereof which extends through the base. On the other hand, the molded portion of this base may also be formed with studs such as 6 and 7 on the side to be located inside the tube and/or externally thereof, but these studs may also be dispensed with, if desired. Similarly, the molded glass element illustrated in this figure in the form of a solid disc having a bevelled edge may also, of course, be formed without this bevelled edge. On the other hand, this element may be provided by molding with an integral projection to be used subsequently for starting the welding of a tube of adequate section, made from the same glass, to constitute the nipple for vacuumizing the electron tube to be mounted on the socket thus obtained.

Figure 3:
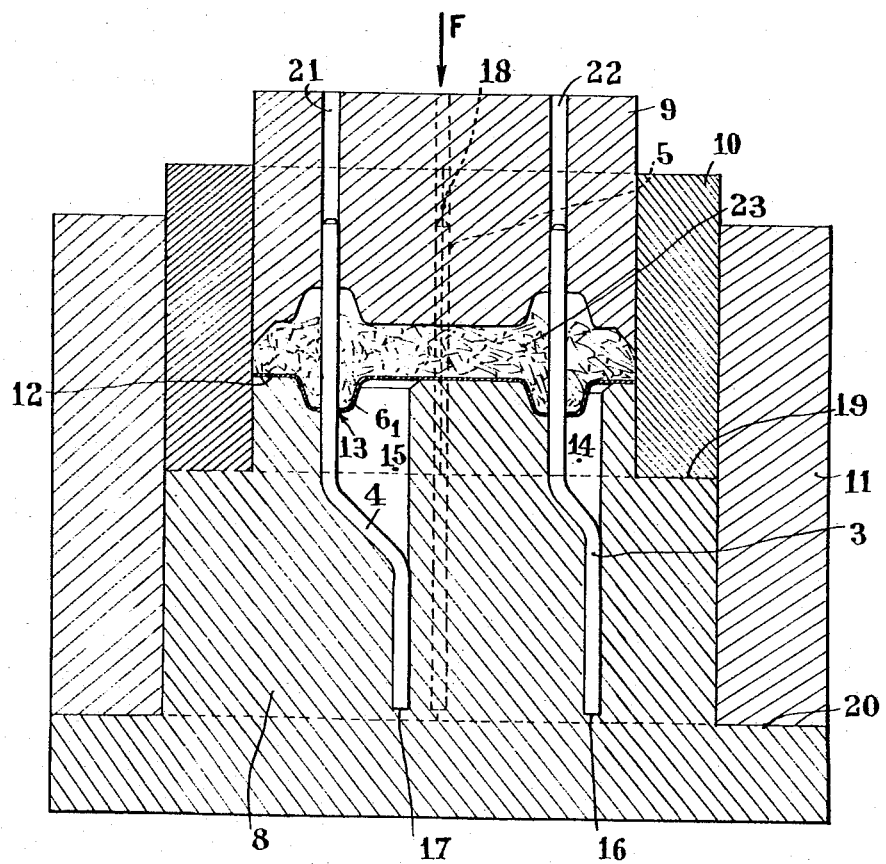
FIGURE 3 is a vertical section view showing a mold for manufacturing the base of FIGURES 1 and 2.

In FIGURE 3 the five-element graphite mold for molding the above-described socket with pre-bent leads is illustrated in vertical section. This mold is derived from the conventional four-element fold. These elements are a pocket 8 (which is just used in this case as a base member), a plunger or punch 9, a ring 10 consisting of two semi-cylindrical sectors assembled along vertical radial sections such as 18, and a binding collar 11 holding the two ring sectors assembled. The ring 10 and collar 11 are each supported by an annular shoulder 19, 20 respectively, formed on the base member. The fifth component element of the mold, which constitutes the improvement brought by this invention, is a destructible die 12 in the form of a thin metal disc cut to the inner diameter of collar 10 and formed with lead-insertion holes such as 13 corresponding to the lead positions and permitting the passage of the rectilinear portions of the leads. If desired, each hole 13 may be surrounded by a pressed, cupped portion such as $6_1$ permitting of forming integrally by molding the insulating studs surrounding each lead. The die 12 is laid on the base 8, the pressed or cupped portions $6_1$ fit in cavities, such as at 14 and 15, formed in the base member and so shaped and machined as to receive in addition the previously bent leads positioned according to the orientation to be obtained in the finished tube. The cavities 14 and 15 terminate at the bottom with blind holes such as 16 and 17 of a width corresponding to the diameter of the lead such as 3 and 4 to be engaged therein; holes 21, 22 are also drilled for receiving the current leads in the punch 9, in alignment with the orifices 13, 14 of die 12.

Furthermore, FIGURE 3 shows the successive steps consisting in fitting the leads in position, inserting the die 12 and the glass fragments 23. The following procedure is adhered to: Firstly, the previously bent leads such as 3 and 4 (that is, leads prepared according to the conventional practice for obtaining a fluid-tight glass-to-metal seal, according to the type of metal used to this end) are slipped into the blind holes such as 16 and 17 formed in the base member 8. The blind holes ensure not only an accurate angular positioning of the lead ends, but also their proper positioning in a vertical direction. Then the pressed-metal die 12 prepared as already explained hereinabove is introduced into the ring 10, the leads engaging the corresponding holes 13, until the lower face of disc 12 contacts the base member 8. Crushed glass fragments 23 having a predetermined granule size are subsequently poured into the cavity thus formed in the ring over a major side surface of the die and eventually the punch 9 is lowered onto the glass, the straight lead portions engaging through holes formed in the punch and aligned with the die holes 13. An additional weight, mass or force designated diagrammatically by the arrow F is then applied to the top of the punch and the complete assembly is placed on the hearth of a glass fusion furnace having a neutral atmosphere, according to the technique well known to those skilled in the art, the aforesaid additional weight, mass or force is adapted to exert the pressure necessary and sufficient for uniformly distributing the glass throughout the space bounded by the ring and available between the die supported by the base member and the punch.

Figure 4:
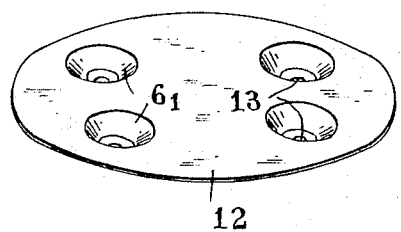
FIGURE 4 is a perspective view showing the pressed metal part constituting the die used for molding the base.

FIGURE 4 is a perspective view showing the metal disc or die 12 with stud-forming cavities such as $6_1$, if required, and holes such as 13 having the diameters of the corresponding leads.

Figure 5:
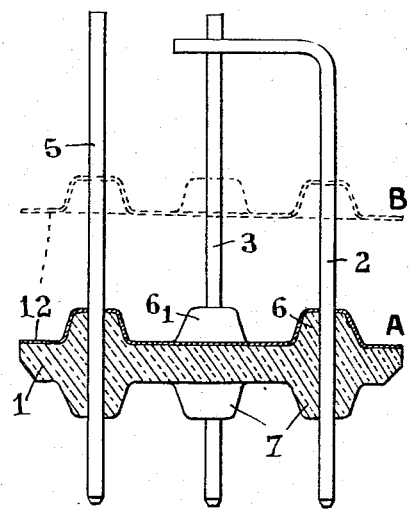
FIGURE 5 is a vertical view partly in section showing the socket as seen from the left-hand side of FIGURE 2, and as obtained after the molding operation, that is, with the glass still in contact with the die.

In FIGURE 5, the die 12 is designated by the letter A in the position of contact with the molded glass element, and also, in broken lines, at B, after it has been separated and lifted off the element before being torn off or cut by using for example small sharp-edged scissors for cutting the metal from the outer edge to the leads to permit its final removal before re-annealing the complex glass-and-metal part thus obtained.

Figure 6:
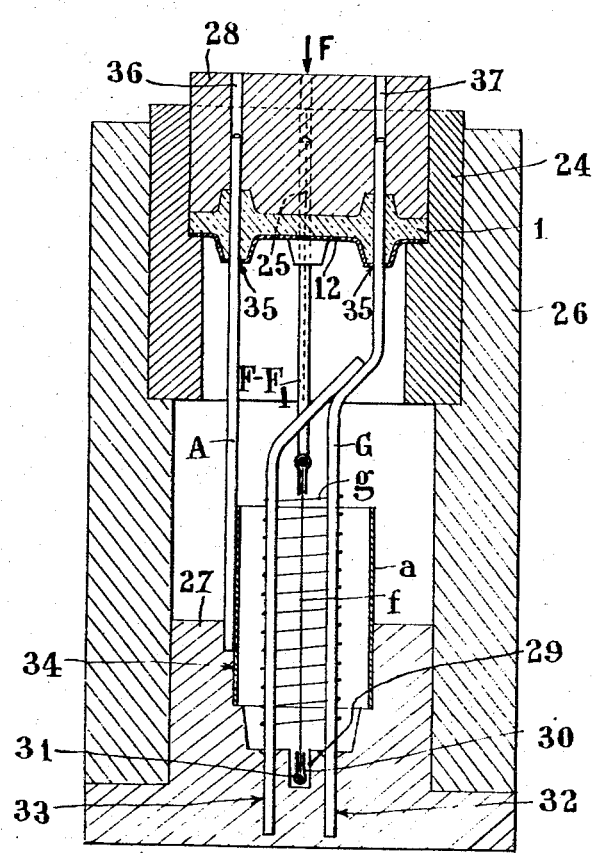
FIGURE 6 is a vertical section view showing a modified form of embodiment of a mold for producing a different base for a three-electrode electron tube.

In FIGURE 6 the glass socket 1 carries the leads acting also as electrode supports; in other words these leads are formed integrally with the electrode supports; they are the anode or plate-support lead A, the grid-support lead G, the two filament-support leads F and $F_1$, the corresponding electrodes proper being designated by the letters $a$, $g$ and $f$.

Each electrode and the corresponding support-lead (for the plate and grid) or the support-leads (for the filaments) are prepared beforehand so as to constitute together a unitary member and avoid any subsequent complementary manufacturing step thereon, while eliminating any solution of continuity detrimental to the proper mechanical resistance of each electrode in the tube.

The above-described assembly is shown in the mold used for assembling its component elements in conjunction with the pressing of the glass element forming with the support-leads the tube base 1. This figure is a vertical axial section of the mold which is assumed to have been made at the end of the pressing operation carried out in conformity with the procedure described hereinabove in connection with FIGURE 3. In this respect, it will be noted that the component elements of the mold of FIGURE 6 are the same as those of the mold of FIGURE 3, that is, a pressed metal disc 12 acting as a die and a graphite ring 24 consisting of two semi-cylindrical elements assembled for instance along a radial section such as 25 by means of a binding collar 26 slipped on the base member 27. The collar and base member 26, 27 are made of graphite. The metal disc 12 bears with its outer marginal portion on an inner shoulder formed in the ring 24, in which a graphite punch 28 is adapted to slide above the die 12.

The electrodes are properly positioned in the supporting base member 27 due to the provision of adequate blind cavities and holes, the support-leads of the electrodes being provided, if required, with the extensions necessary therefor; these extensions are subsequently removed, if necessary. Thus, in the specific case illustrated concerning a triode having a cylindrical anode or plate $a$ a horizontal milled slot 29 permits inserting a staple 30 connecting the filament $f$ with its tension spring 31 and the horizontal portion of the spring. Two blind holes 32, 33 receive the uprights of grid $g$ while the anode $a$ is fitted in a bore 34. The electrode support-leads extend through the orifices 35 of die 12 and engage through holes such as 36 and 37 formed in the punch 28 in alignment with the aforesaid orfices 35.

Of course, the specific examples described hereinabove and illustrated in the accompanying drawings should not be construed as limiting the applications of the present invention; as will readily occur to anybody conversant with the art, other means for positioning and holding the electrodes and electrode support-leads of an electron tube in a mold according to this invention may be devised without departing from the spirit and scope of the invention as set forth in the appended claims.

After having properly positioned and held the electrodes the molding process and the subsequent stripping step may be carried out exactly as in the first example described hereinabove, whereafter any trace of oxidation is removed from the molding assembly by using any known and suitable physical and/or chemical treatment.

What we claim is:

1. A method of manufacturing an electron tube base comprising, disposing temporarily in a supported condition a plurality of pre-shaped leads of said electron tube in positions relatively fixed corresponding to an arrangement of positions in which said leads are disposed permanently angularly spaced in said electron tube base, inserting said leads into lead-insertion holes receiving said leads on a disc-shaped, destructible, metallic film die and supporting said die on a bottom side surface thereof with said leads extending through said lead-insertion holes and transversely of said die, disposing glass particles over a top side surface of said die opposite to the bottom side surface, confining said glass particles and said destructible die in a space of confinement, melting said glass particles into an integral mass defining said base, applying pressure to the molten glass while confined directing pressure forces toward said die to make the molten glass flow into all portions of said space of confinement thereof to shape the molten glass into a desired configuration of said base and to flow about each lead along a limited axial length thereof for adherence to each lead and for holding said leads axially in fixed positions and fixed angularly relative to each other when the mass of molten glass hardens, setting the molten glass sufficiently for removal of said destructible die and said mass of glass thereon from the space of confinement thereof, removing said die and mass of glass from said space of confinement, and removing said metallic destructible die from the tube base.

2. A method of manufacturing an electron tube base according to claim 1, comprising treating said bottom side surface with a graphite release agent.

3. A method of manufacturing an electron tube base according to claim 1, in which said glass particles are melted in a neutral atmosphere.

4. A method of manufacturing an electron tube according to claim 1, in which the supported metallic film die comprises supported stud-forming cupped portions about each respective lead-insertion hold, and in which said space of confinement comprises a plurality of stud-forming axial subspaces confronting respective cupped portions of said die coaxial with said leads and said cupped portions, and in which the pressure forces applied toward said die are sufficient to flow molten glass into said cupped portions of said die and into said subspaces, whereby said base when removed from said space of confinement comprises studs formed on opposite sides thereof through which said leads extend axially.

5. A method of manufacturing an electron tube base comprising, disposing temporarily in a supported condition a plurality of pre-shaped leads of said electron tube in positions relatively fixed corresponding to an arrangement of positions in which said leads are disposed permanently angularly spaced in said electron tube base, inserting said leads into lead-insertion holes receiving said leads on a disc-shaped, destructible, metallic film die and supporting said die on a bottom side surface thereof with said leads extending through said lead-insertion holes and transversely of said die, disposing glass particles over a top side surface of said die opposite to the bottom side surface, confining said glass particles and said destructible die in a space of confinement configured to correspond to the tube base and having subspaces corresponding to studs on opposite sides of said tube base through which individual leads extend axially, melting said glass particles into an integral mass defining said base, applying pressure to the molten glass while confined directing pressure forces toward said die to make the molten glass flow into all portions and subspaces of said space of confinement thereof to shape the molten glass into a desired configuration of said base and to flow about each lead along a limited axial length thereof for adherence to each lead and for holding said leads axially in fixed positions and fixed angularly relative to each other when the mass of molten glass hardens, setting the molten glass sufficiently for removal of said destructible die and said mass of glass thereon from the space of confinement thereof, removing said die and mass of glass from said space of confinement, and removing said metallic destructible die from the tube base.

6. A mold for manufacturing an electron tube base comprising, means for disposing temporarily in a supported condition a plurality of pre-shaped leads of said electron tube in positions relatively fixed corresponding to an arrangement of positions in which said leads are disposed permanently angularly spaced in said electron tube base including means for receiving a disc-shaped, destructible, metallic film die having lead-insertion holes and for supporting said die on a bottom side surface thereof with said leads inserted in said holes extending through said lead-insertion holes and transversely of said die, means defining a cavity for receiving glass particles over a top side surface of said die opposite to the bottom side surface including removable means cooperative with the last-mentioned means for confining said glass particles, said destructible die and a length of each of said leads adjacent said destructible die in a space of confinement of said cavity for melting said glass particles while confined into an integral mass defining said base and operable axially of said leads to apply pressure to the molten glass while confined directing pressure forces toward said die to make the molten glass flow to shape the molten glass into a desired configuration of said base and to flow about each lead along a limited axial length thereof for adherence to each lead and for holding said leads axially in fixed positions and fixed angularly relative to each other when the mass of molten glass hardens, and the removable means being selectively removable after setting of the molten glass sufficiently to allow removing said die and mass of glass from said space of confinement and removing of said metallic destructible die from the tube base.

References Cited

UNITED STATES PATENTS

| | | | |
|---|---|---|---|
| 301,329 | 7/1884 | Beck | 65—23 |
| 2,246,463 | 6/1941 | Garratt | 65—23 |
| 2,290,050 | 7/1942 | Hinkley et al. | 65—140 X |
| 2,415,412 | 2/1947 | Buchwald et al. | 65—23 |
| 2,504,842 | 4/1950 | Juvinall et al. | 65—138 |
| 2,888,783 | 6/1959 | Turnbull | 65—59 X |
| 3,227,416 | 1/1966 | Fessel | 249—61 |

FOREIGN PATENTS 954,659  10/1947  France.

DONALL H. SYLVESTER, *Primary Examiner.*

F. W. MIGA, *Assistant Examiner.*